United States Patent
Jascau et al.

(10) Patent No.: US 7,458,100 B2
(45) Date of Patent: Nov. 25, 2008

(54) ADDING COPY PROTECTION TO A COMPUTER PROGRAM

(75) Inventors: Adrian Jascau, Munich (DE); Andreas Lange, Munich (DE)

(73) Assignee: Aladdin Europe GmbH, Germering (DE)

( * ) Notice: Subject to any disclaimer, the term of this patent is extended or adjusted under 35 U.S.C. 154(b) by 693 days.

(21) Appl. No.: 10/756,896

(22) Filed: Jan. 14, 2004

(65) Prior Publication Data

US 2005/0010805 A1   Jan. 13, 2005

(30) Foreign Application Priority Data

Jan. 14, 2003   (EP)   ................................ 03000811

(51) Int. Cl.
   *H04L 9/00* (2006.01)
(52) U.S. Cl. .................... 726/26; 380/255; 705/54; 705/55; 705/57; 705/58; 713/189
(58) Field of Classification Search ................ 726/26; 380/255; 705/57–58, 54–55; 713/189
   See application file for complete search history.

(56) References Cited

U.S. PATENT DOCUMENTS

| | | | |
|---|---|---|---|
| 5,109,413 A | 4/1992 | Comerford et al. | |
| 5,291,598 A * | 3/1994 | Grundy | 726/28 |
| 5,630,057 A | 5/1997 | Hait | |
| 5,666,411 A * | 9/1997 | McCarty | 705/51 |
| 5,754,646 A | 5/1998 | Williams et al. | |
| 6,052,780 A * | 4/2000 | Glover | 713/193 |
| 6,266,416 B1 * | 7/2001 | Sigbjørnsen et al. | 380/255 |
| 6,334,189 B1 * | 12/2001 | Granger et al. | 726/26 |
| 6,480,959 B1 * | 11/2002 | Granger et al. | 713/189 |
| 6,681,212 B1 * | 1/2004 | Zeng | 705/51 |
| 7,111,285 B2 * | 9/2006 | Smith et al. | 717/140 |
| 2007/0061893 A1 * | 3/2007 | Black et al. | 726/27 |

FOREIGN PATENT DOCUMENTS

EP    0 175 557 A1    3/1986

* cited by examiner

*Primary Examiner*—Minh Dieu Nguyen
(74) *Attorney, Agent, or Firm*—Patterson, Thuente, Skaar & Christensen, P.A.

(57) ABSTRACT

A method of adding a copy protection function to a program to be installed on a computer system comprising a copy protection unit is provided, said method comprising the steps of determining a decision section of the program, wherein information influencing the further course of the program is defined during execution of the program, as a function of the current running state of the program, and converting the decision section by means of code which is executable exclusively in the copy protection unit and which is executed in the copy protection unit during execution of the program.

22 Claims, 1 Drawing Sheet

ADDING COPY PROTECTION TO A COMPUTER PROGRAM

FIELD OF THE INVENTION

The invention relates to a method of copy protecting a program installed on a computer system, the computer system comprising a copy protection unit.

BACKGROUND OF THE INVENTION

In order to protect a program against unauthorized use, the program is often designed by the software manufacturer in such a way that it is executable on the computer system only if the computer system comprises a copy protection unit. Such copy protection unit is, for example, a hardware unit, which is often referred to as a dongle and is connected to the computer system via an interface.

The dongle verifies, for example, when calling the program, whether a license key stored on the dongle is identical with the license key in the program. If this is the case, the run authorization is present and the program, which is often present in partially encoded form, is decoded so as to be executable.

A disadvantage of this approach consists in that, after said decoding by means of the dongle, plain text data are present in the computer system, which data may be used to make program copies which are executable without the dongle and to analyze the program.

SUMMARY OF THE INVENTION

In view thereof, it is an object of the invention to provide a method of copy protecting a program installed on a computer system, the computer system comprising a copy protection unit, said method enabling improved protection of the program against misuse.

According to the invention, the object is achieved by a method of adding a copy protection function to a program installed on a computer system, the computer system comprising a copy protection unit, said method comprising the following steps:

determining a decision section of the program, wherein information influencing the further course of the program is being defined during execution of the program, depending on the current running state of the program, and converting the decision section by means of code executable exclusively in the copy protection unit, said code being executed during execution of the program in the copy protection unit. In particular, said code is executed during execution of the program only if a run authorization is present.

By converting the decision section by means of code executable exclusively in the copy protection unit, execution of the decision section is practically swapped to the copy protection unit, thus ensuring that the program is executable on the computer system only if the computer system comprises said copy protection unit. This prevents execution of an illegally made copy of the program on a computer system which does not comprise said copy protection unit.

Further, it is made more difficult to analyze the program, because the swapped decision section is incomprehensible without precise knowledge of the structure of the copy protection unit. In this connection, it should be borne in mind that the structure of the copy protection unit is usually not known to the public, because the copy protection unit is designed to prevent illegal copying and illegal use of the program.

The copy protection unit, which may be a dongle, for example, preferably includes a controller, a memory as well as an input/output unit and may be employed in a useful manner, in particular, not alone, but together with the or a computer system. However, the copy protection unit may also be located on the computer system itself or on another computer system. This may be, in particular, a pure software area (for example, of the computer system on which the program is to be installed), which is protected against aggression by hackers and/or cannot be directly copied, for example.

A particular advantage of the method according to the invention is that a decision section is swapped into the copy protection unit. Since a program essentially comprises calculation and decision sections (in particular at the machine code level), and said decision sections often cause branching of the program flow, said decision sections are very important in understanding the program structure. Now, if one or several decision sections are executed in the copy protection unit itself, they are no longer accessible for analysis, so that the context and the logic of the instruction sequence of the program is lost, which makes it clearly more difficult to analyze the program as a whole.

A further advantage of selectively swapping the decision section(s) is that execution of the decision section(s) in the copy protection unit requires comparatively little computing performance of the copy protection unit and a small data transmission capacity between the copy protection unit and the rest of the computer system, so that the copy protection unit may be realized in a less complex manner. Also, the steps of determination and conversion may be realized in a less complex manner, and the run-time behaviour of a program to which a copy protection function has been added by the method according to the invention is influenced only slightly.

Thus, after execution of the method according to the invention, in particular, an already existing copy protection unit of the computer system (such as a dongle), may be used for a different purpose than originally intended, in order to execute the decision section of the program, when executing the program to which the copy protection function has been added. In doing so, the copy protection unit is not used for its actual purpose of verifying the presence of a run authorization and/or optionally required decoding and/or encoding of program parts, but for execution of part of the program itself. Thus, the copy protection unit is used to realize the functionality to be provided by the program.

Thus, the decision section to be executed by the copy protection unit during execution of the program is, in particular, a different function than the function of verifying the presence of the run authorization of the program and than the function of decoding and/or encoding parts of the program.

Accordingly, by swapping one or more decision sections of the program, it is advantageously sufficient for the copy protection unit to have clearly less computing performance than the computer system without the copy protection unit. Also, the data transmission capacity between the computer system and the copy protection unit need not be particularly high. Thus, the computing performance of the copy protection device may be one, two or more orders of magnitude smaller than that of the computer system. For example, the controller of the copy protection unit may be clocked at a clock frequency of a few kHz, whereas the clock frequency of a processor of the computer system may be in the MHz to GHz range. Furthermore, the storage capacity of the copy protection unit may be merely a few hundred bytes as compared to several Mbytes for the computer system.

The computer system according to the invention may be a single computer, a computer network or any other programmable device by which the program instructions of the program may be executed. Likewise, the copy protection unit may also be a single computer, a computer network or any other programmable device, by which the code for converting the decision section is executable and which is connectable with the computer system according to the invention and, in this sense, is part of the computer system according to the invention.

In particular, the copy protection unit serves to verify the run authorization of a program, preferably of the program to which the copy protection function is to be added.

By stating herein that the code for converting or realizing the decision section is executable only in the copy protection unit, it is meant that it is code which, although being executable in the copy protection unit itself, is not executable in the rest of the computer system. There may be several copy protection units in which said code is executable. However, there is preferably only one single copy protection unit which can execute said code. Thus, the program to which said copy protection function has been added is bound to the copy protection unit and is executable only in the presence of the copy protection unit and in the presence of the run authorization, which is preferably verified by the copy protection unit.

The decision section may be, in particular, a decision section for deciding by which of at least two or more possible executive paths the program will be continued, depending on the current running state of the executed program.

In swapping multiple decision sections, it has turned out that very high security against misuse of the program is already achieved by a small percentage of swapped decision sections. The swapped part, which may be quantified, for example, by the ratio of swapped program lines (or instructions) to total program lines (or instructions) of the program, may be a few percent (e.g. 5%) or more, for example.

In particular, in the method according to the invention, said code, when being executed, may effect a (logical) comparison of two data values and define information as a function of the result of said comparison. Such comparison may be effected without extensive computing, so that the speed of execution of the program does not decrease considerably.

In the method according to the invention, the defined information particularly preferably contains a program address at which execution of the program is resumed. This allows easy realization of the desired branching or of the selection of the executive path on which execution of the program is resumed.

In particular, a program instruction may be provided in the conversion or realization step, which program instruction, when being executed, causes the copy protection unit to be called (or activated), including transfer of the data required for execution of the decision section and, optionally, of a processing regulation (or function), which is applicable to the data, to the copy protection unit. Thus, swapping of the decision section into the copy protection unit is easily realizable.

The data may be parameters, one or more program addresses, which are selected according to the current running state of the program during execution of the decision section in the copy protection device. The processing regulation itself may also be transferred here. In doing so, it is particularly preferred if the data to be transferred (and processing regulations to be optionally transferred) are provided in the program in an encoded manner and are transferred to the copy protection unit in said encoded form. During execution of the program to which the copy protection function has been added, decoding is effected only in the copy protection unit. This further improves security against misuse, so that, even upon disassembly of the program, only the copy protection unit call is recognizable, but not the transferred data and the optionally transferred processing regulation.

A particularly preferred embodiment of the method according to the invention consists in that, during the determining step, the decision section is determined on the basis of its sequence of instructions in the program (or on the basis of its instruction structure), which is typical of the decision section. Thus, the method is very easy to automate.

It is particularly advantageous, if several different code conversions are stored, for example in a database, for each type of decision section. In this case, if several decision sections of the same type are determined, these may be converted differently into code which is executable exclusively in the copy protection unit. Thus, when analyzing the program to which the copy protection function has been added, different types of decision sections appear to have been swapped, because they are, in fact, represented by different codes. This leads to a further increase in security against misuse.

Further, the determination and conversion steps of the method according to the invention may be executed several times, so that several decision sections are determined and converted by means of code which is executable exclusively in the copy protection unit, the number of converted decision sections being defined according to a predetermined characteristic of the program. For example, said characteristic may be a degree of swapping (swapped program lines or program instructions in relation to the total program lines or instructions), one or more different instruction structures or instruction sequences to be swapped and/or a likely reduction in the speed of execution of the program. As a function of the thus defined program characteristic or requirement, the number of decision sections to be swapped is then determined and converted into code which is executable exclusively in the copy protection unit.

Further, a peripheral computer device for adding a copy protection function to a program, which is installed on a computer system provided with a copy protection unit, is provided, wherein said device comprises a determining module, which determines a decision section of the program in which a piece of information influencing the further course of the program is defined as a function of the current running state of the program during execution of the program, and a converting module, which represents the determined decision section by means of code executable exclusively in the copy protection unit, said code then being executed in the copy protection unit during execution of the program.

Using the device, a copy protection function may be advantageously added to the program. In particular, the advantages described in connection with the method according to the invention are achieved.

The device may be further embodied so as to realize the preferred embodiments of the method according to the invention.

Further, a computer program product according to the invention is provided which comprises software code, by which the steps of the method according to the invention (and, in particular, of its embodiments) are executed when the product is being executed on a computer.

According to an advantageous embodiment, the computer program product according to the invention is stored on a data storage medium which is readable by the computer. As data carrier, any medium may be used from which the stored computer program may be read by the computer, such as a diskette, a CD, a DVD, a magnetic tape, a hard disk, or other non-volatile storage elements.

BRIEF DESCRIPTION OF THE DRAWINGS

The invention will be explained in more detail below, by way of example and with reference to the drawings, wherein.

DETAILED DESCRIPTION OF THE PREFERRED EMBODIMENTS

Figure 1:
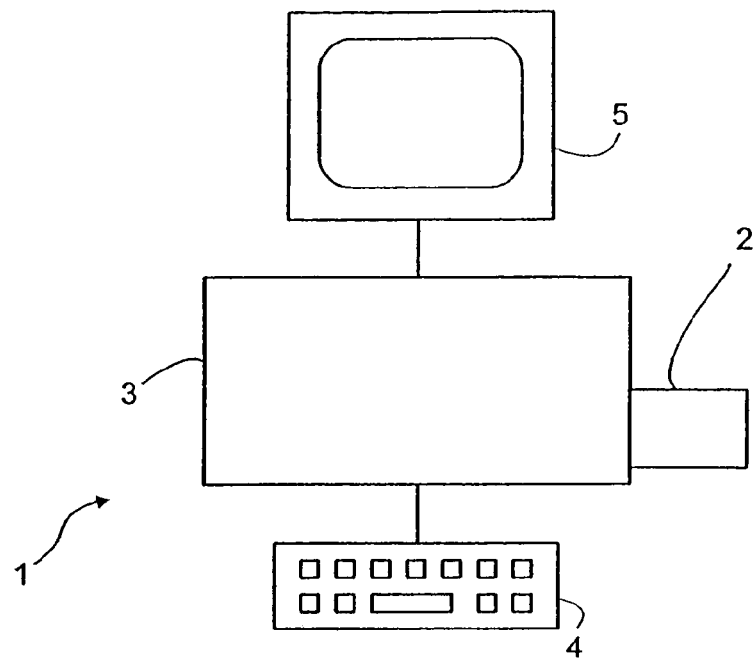
FIG. 1 shows a schematic view of a computer system comprising a copy protection unit.

The computer system 1 comprises a computing section 3 (comprising, for example, a processor, a hard disk, further hardware elements as well as an operating system), an input unit 4 (in this case, for example, a keyboard) as well as an output unit 5 (e.g. a screen).

The copy protection unit 2, in turn, comprises a controller, a memory, as well as an input/output unit (none of which are shown), and is plugged into an interface of the computer 1 (in this case, the USB interface, or Universal Serial Bus interface). Of course, it may also be plugged into any other interface (e.g. a parallel interface) of the computer 1. In this case, the copy protection unit 2 is provided without its own current supply and is accordingly supplied with energy via the interface of the computer 1.

Figure 2:
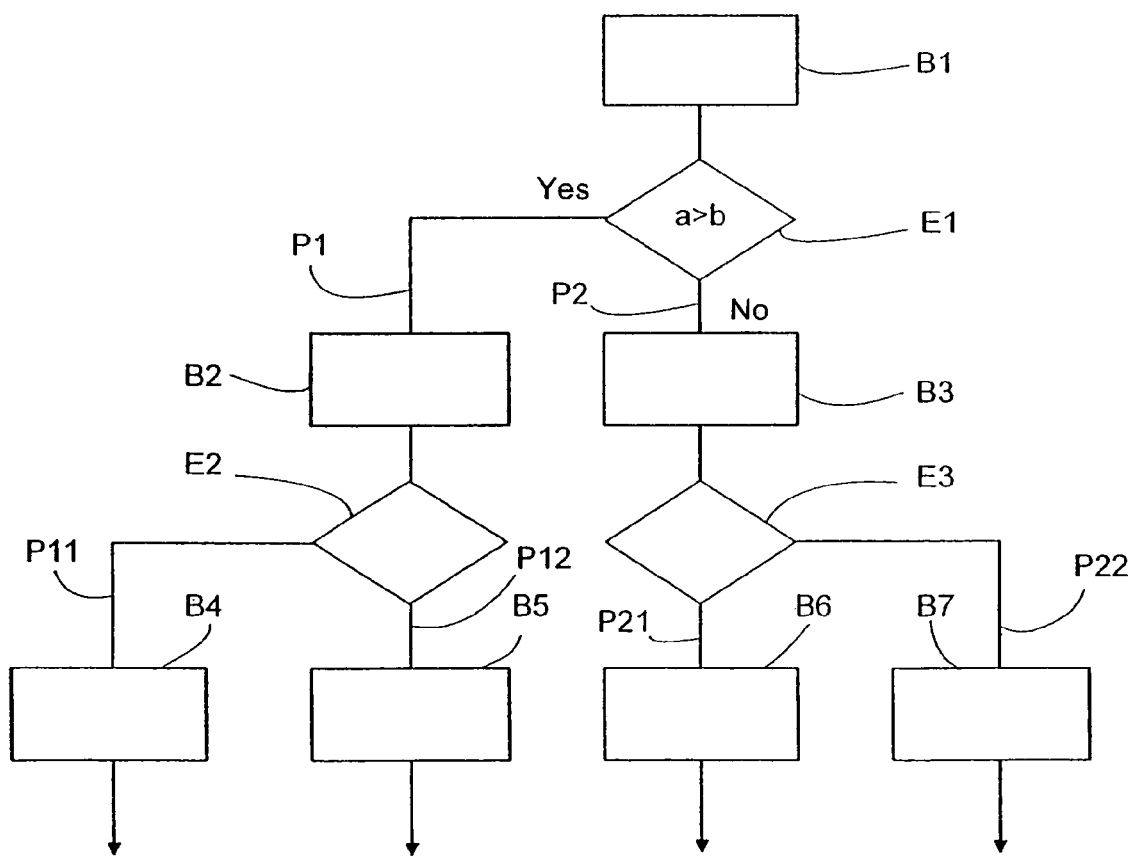
FIG. 2 shows a schematic representation of the structure of a program to which the copy protection function is to be added.

FIG. 2 schematically shows a flowchart of part of the program to which the copy protection function is to be added, with rectangles B1, B2, B3, B4, B5, B6, B7 respectively denoting a computing section of the program, wherein calculations are to be executed. The diamonds E1, E2 and E3 represent decision sections, by which the executive path P1, P2, P11, P12, P21, P22, along which execution of the program will be effected, is established during execution of the program as a function of the current running state.

For example, the decision section E1 is a logical comparison of the values of parameters a and b, with execution of the program being resumed in the computing section B2 (along executive path P1), if the value of parameter a is greater than that of parameter b. Otherwise, the program will be resumed in the computing section B3 (i.e. along executive path P2).

In the method according to the invention, the decision section E1 is now determined in a determining step and is then converted or represented, in a further step, by means of code executable exclusively in the copy protection unit 2. If the program is present in machine code, those instructions which represent the decision section E1 are replaced, for example, by a call instruction comprising several arguments. When the call instruction is to be executed, during execution of the program in the computer system, its arguments are transmitted to the copy protection unit 2. Said arguments contain parameters a and b or their values, the comparison operation to be applied, as well as the program addresses of the computing sections B2 and B3. Preferably, said arguments are present in encoded form, of course, which is also the form in which they are transferred to the copy protection unit where decoding is then effected.

During execution of the program, the copy protection unit 2 effects the comparison between the parameter values of a and b and merely outputs the address of the computing section B2 or B3 as a result, so that the program may be resumed by the computer 1 at this point. Since the copy protection unit 2 usually executes the decision section E1 or the corresponding code in a manner not visible to the computer 1, the desired security is obtained.

The method steps according to the invention are preferably carried out in a peripheral device which may be configured essentially in the same way as the computer system shown in FIG. 1. The copy protection unit 2 may be provided, but does not have to be provided. There merely need to be the required data allowing to generate the code executable exclusively in the copy protection units 2.

In the method according to the invention, it is particularly preferred if the decision sections, which are to be converted into code executable exclusively in the copy protection unit 2, are determined by means of typical instruction sequences of the decision sections and are then converted into the code for the copy protection unit 2. These characteristic instruction sequences, or also typical instructions themselves, are present both at the machine code level and in higher programming languages.

In particular, a compiler for generating machine code may also be extended such that the method steps according to the invention are carried out and, consequently, the copy protection function is added to the program already when compiling the latter.

In the described embodiment example, the copy protection unit 2 is a separate hardware element, which is connected with the computer system. This connection may also be effected indirectly, via networks or other interposed computers. Alternatively, the copy protection unit may also be realized essentially as software. Thus, for example, in a protected area of the computer 1, which is closed to the rest of the computer 1, a corresponding process may run, which is called during execution of the program. In doing so, the required data are transmitted in the same manner as described above. In particular, the data are, of course, in encoded form and are decoded and executed in the protected area, and only the result is then output again from the protected area, so that execution of the program may be resumed. Thus, the protected area is closed to the outside and is not open for inspection.

The process running in the protected area is preferably carried out only if the presence of a run authorization can be determined. This may be done in a known manner. For example, a license key may be compared with a predetermined license key. Of course, this likewise applies to the above-described copy protection unit 2.

What is claimed is:

1. A method of copy protecting a program to be installed on a computer system, said computer system including a computing section and a copy protection unit, said method comprising:

determining a decision section of the program, which decision section, during execution of the program as a function of a current running state of the program, defines information influencing further course of the program; and converting the decision section of the program to produce a copy-protected version of the program, wherein converting comprises:

providing code in the copy-protected version of the program, wherein said code is executable exclusively in the copy protection unit and exclusively during execution of the copy-protected version of the program in the computing section, and wherein said code includes data and a processing regulation applicable to the data for execution of the decision section of the program; and providing a program instruction in the copy-protected version of the program, the program instruction being configured such that, during execution of the copy-protected version of the program in the computing section, the copy protection unit is called and the code is transferred to the copy protection unit for execution therein.

2. The method as claimed in claim 1, wherein said code effects a comparison of two data values and a definition of the information as a function of a result of said comparison when the code is executed.

3. The method as claimed in claim 1, wherein said information comprises a program address at which execution of the program is resumed.

4. The method as claimed in claim 1, wherein the data and the processing regulation are encoded and are transferred to the copy protection unit in encoded form.

5. The method as claimed in claim 1, wherein the code in the copy protection unit is executed in a protected area of the computer system, wherein the protected area is closed to the rest of the computer system.

6. The method as claimed in claim 1, wherein determining a decision section of the program further comprises determining the decision section according to an instruction sequence of the decision section in the program.

7. The method as claimed in claim 1, further comprising repeating the determining a decision section of the program and converting the decision section to determine and convert a plurality of decision sections, wherein if two similar decision sections are determined, the similar decision sections are converted by different codes in the converting.

8. A system for adding copy protection to a program to be installed on a computer system that includes a computing section and a copy protection unit, the system comprising:
   a computing device programmed to determine a decision section of the program, which decision section, during execution of the program as a function of a current running state of the program, defines information influencing further course of the program; and
   wherein the computing device is further programmed to produce a copy-protected version of the program, the computer device being configured to convert the decision section of the program into a program instruction portion and a code portion of the copy-protected version of the program;
      wherein the code portion is executable exclusively in the copy protection unit and exclusively during execution of the copy-protected version of the program in the computing section, and wherein the code includes data and a processing regulation applicable to the data for execution of the decision section of the program; and
      wherein the program instruction portion is configured such that, during execution of the copy-protected version of the program in the computing section, the copy protection unit is called and the code is transferred to the copy protection unit for execution therein.

9. The system as claimed in claim 8, wherein said code effects a comparison of two data values and a definition of the information as a function of a result of said comparison.

10. The system as claimed in claim 8, wherein said information comprises a program address at which execution of the program is resumed.

11. The system as claimed in claim 8, wherein the data and the processing regulation are encoded and are transferred to the copy protection unit in encoded form.

12. The system as claimed in claim 8, wherein the code in the copy protection unit is executed in a protected area of the computer system, wherein the protected area is closed to the rest of the computer system.

13. The system as claimed in claim 8, wherein the decision section is determined according to an instruction sequence of the decision section in the program.

14. The system as claimed in claim 8, wherein a plurality of decision sections are determined and converted, and wherein if two similar decision sections are determined, the similar decision sections are converted by different codes.

15. A computer-readable storage medium comprising a program for adding copy protection to a preexisting program to be installed on a computer system that includes a computing section and a copy protection process, said computer program comprising:
   a determining section that, when executed on a computing device, causes the computing device to determines a decision section of the preexisting program, which decision section, during execution of the preexisting program as a function of a current running state thereof, defines information influencing further course of the preexisting program; and
   a converting section that, when executed on the computing device, causes the computing device to produce a copy-protected version of the preexisting program, the converting section being configured to cause the computing device to convert the decision section into a program instruction portion and a code portion of the copy-protected version of the program;
      wherein the code portion is executable exclusively in the copy protection process and exclusively during execution of the copy-protected version of the preexisting program in the computing section, and wherein the code includes data and a processing regulation applicable to the data for execution of the decision section of the preexisting program; and
      wherein the program instruction portion is configured such that, during execution of the copy-protected version of the preexisting program in the computing section, the copy protection process is called and the code is transferred to the copy protection process for execution therein.

16. The computer-readable storage medium as claimed in claim 15, wherein said code effects a comparison of two data values and a definition of the information as a function of a result of said comparison.

17. The computer-readable storage medium as claimed in claim 15, wherein said information comprises a preexisting program address as which execution of the preexisting program is resumed.

18. The computer-readable storage medium as claimed in claim 15, wherein the determining section further comprises a program instruction that, when executed, calls the preexisting program and transfers the code to the copy protection process.

19. The computer-readable storage medium as claimed in claim 15, wherein the data and the processing regulation are encoded and are transferred to the computer program in encoded form.

20. The computer-readable storage medium as claimed in claim 15, wherein the code in the copy protection process is executed in a protected area of the computer system, wherein the protected area is closed to the rest of the computer system.

21. The computer-readable storage medium as claimed in claim 15, wherein the decision section is determined according to an instruction sequence of the decision section in the preexisting program.

22. The computer-readable storage medium as claimed in claim 15, wherein a plurality of decision sections are determined and converted, and wherein if two similar decision sections are determined, the similar decision sections are converted by different codes.

* * * * *